United States Patent [19]

Gessell

[11] 4,163,831
[45] Aug. 7, 1979

[54] HIGH EFFICIENCY TITANATE CATALYST FOR POLYMERIZING OLEFINS

[75] Inventor: Donald E. Gessell, Baton Rouge, La.

[73] Assignee: The Dow Chemical Company, Midland, Mich.

[21] Appl. No.: 735,481

[22] Filed: Oct. 26, 1976

Related U.S. Application Data

[63] Continuation-in-part of Ser. No. 581,293, May 27, 1975, abandoned, which is a continuation-in-part of Ser. No. 463,213, Apr. 22, 1974, abandoned.

[51] Int. Cl.$^2$ .......................... C08F 4/66; C08F 10/02
[52] U.S. Cl. .................. 526/153; 252/429 C; 252/431 R; 526/125; 526/151; 526/158; 526/352
[58] Field of Search .................. 526/151, 158, 153

[56] References Cited

U.S. PATENT DOCUMENTS 3,737,393   6/1973   de Vries .................. 526/151

FOREIGN PATENT DOCUMENTS 828152 10/1975 Belgium .
2209874 10/1972 Fed. Rep. of Germany .
1235062 6/1971 United Kingdom ...................... 526/151
1251177 10/1971 United Kingdom ...................... 526/151

Primary Examiner—Edward J. Smith

[57] ABSTRACT

Compositions exhibiting high catalytic activity in the polymerization of α-olefins are provided by reacting compound of titanium, e.g., a titanate such as tetra(isopropoxy)titanium, an organomagnesium compound or complex such as a hydrocarbon soluble complex of dialkyl magnesium and an alkyl aluminum, e.g., di-n-butylmagnesium 1/6 triethylaluminum and an alkyl aluminum halide. The organomagnesium component is highly concentrated in hydrocarbon diluent at the time it reacts with the metallic halide. The resulting catalysts when used in slurry polymerization processes produce polyolefin powders having higher bulk densities than those produced using conventional high efficiency catalysts.

9 Claims, No Drawings

4,163,831

HIGH EFFICIENCY TITANATE CATALYST FOR POLYMERIZING OLEFINS

CROSS-REFERENCE TO RELATED APPLICATIONS

This application is a continuation-in-part application of application Ser. No. 581,293 filed May 27, 1975, now abandoned, which is a continuation-in-part application of application Ser. No. 463,213 filed Apr. 22, 1974, now abandoned.

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially unbranched polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. No. 3,113,115 and U.S. Pat. No. 3,257,332. In these methods, the catalyst employed is obtained by admixing a compound of a transition metal of Groups 4b, 5b, 6b and 8 of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, which is normally hydrogen, is usually present in the reaction vessel in order to suppress the formation of undesirably high molecular weight polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivation agent such as aqueous base. Such catalyst deactivation and/or removal procedures are expensive both in time and material consumed as well as the equipment required to carry out such treatment.

Moreover, most slurry polymerization processes employing the aforementioned known catalyst systems are accompanied by reactor fouling problems. As a result of such reactor fouling, it is necessary to frequently stop the process to clean the polymerization reactor.

Recently, catalysts having higher efficiencies have been disclosed, e.g., U.S. Pat. No. 3,392,159, U.S. Pat. No. 3,737,393, Dutch Patent Application No. 7203108 and West German Patent Application No. 2,231,982. While the increased efficiencies achieved by using these recent catalysts are significant, polyolefin powders produced at slurry polymerization temperatures, e.g., less than 100° C., in the presence of such catalysts often have undesirably low bulk densities (usually less than 10 pounds/cubic foot).

In view of the foregoing problems encountered in the use of conventional Ziegler catalysts, it would be highly desirable to provide a polymerization catalyst which is sufficiently active to eliminate the need for catalyst residue removal and which minimizes reactor fouling problems. In slurry polymerization processes, it would be especially desirable to provide a high efficiency catalyst that will yield a polyolefin powder having increased bulk density.

SUMMARY OF THE INVENTION

The present invention, in one aspect, is the catalytic reaction product of (A) a compound of tetravalent or trivalent titanium with (B) an intermediate reaction product of (a) an organomagnesium component and (b) a metallic halide provided that during the formation of the intermediate product the concentration of organomagnesium component is at least 0.1 molar with respect to magnesium. The magnesium component is an organomagnesium compound or a complex of the organomagnesium compound and an organometallic compound which solubilizes the organomagnesium compound in hydrocarbon. The metallic halide corresponds to the empirical formula $MR_{3-1}X_a$ wherein M is a metal of Group 3a, R is alkyl, alkoxy, aryl or aryloxy; X is halogen; and a is in the range from 1 to 3. The proportions of the foregoing components of said catalytic reaction products are such that the atomic ratio of Mg:Ti is greater than 10:1 up to about 200:1, the atomic ratio of M:Ti is within the range from about 10:1 to about 500:1, the atomic ratio of Mg:X is within the range from about 0.05:1 to about 1:1.

In a second aspect, the invention is a process for polymerizing an α-olefin under conditions characteristic of Ziegler polymerization wherein the aforementioned reaction product is employed as the sole catalyst or in combination with a common Ziegler catalyst activator such as an alkyl aluminum compound.

The aforementioned reaction product of titanium compound, organomagnesium component and metallic halide is a high yield catalyst capable of producing more than 200,000 weight parts of olefin polymer per weight part of titanium. Accordingly, olefin polymers produced in accordance with the foregoing process generally contain lower amounts of titanium catalyst residues than polymers produced in the presence of conventional catalysts even after subjecting such polymers to catalyst removal treatments. Moreover, the novel reaction products of the present invention almost entirely eliminate reactor fouling problems characteristic of simple two-component Ziegler catalysts. Further, these catalytic reaction products enable a higher degree of control over the polymerization in order that a more uniform product can be made. For example, as a result of concentrating the organomagnesium component in hydrocarbon during the preparation of the catalytic reaction product, the polymer powders made under slurry polymerization temperatures in the presence of such a catalytic reaction product possess higher bulk densities thus minimizing the danger of polyolefin dust explosions. Additionally, by decreasing the Mg:X ratio within the range described hereinbefore, the molecular weight distribution of the resulting polyolefin may be broadened from very narrow, e.g., weight average to number average Mw/Mn less than 6, to broader distribution, e.g., Mw/Mn of 8 or more. The aforementioned polymers are highly useful in molding applications such as injection molding, film application and rotational molding.

DETAILED DESCRIPTION OF THE PREFERRED EMBODIMENTS

The present invention is most advantageously practiced in a slurry polymerization process wherein an α-olefin is polymerized, generally in the presence of hydrogen as a molecular weight control agent, in a polymerization zone containing an inert diluent and the reaction product as hereinbefore described. The foregoing polymerization process is most beneficially carried out under inert atmosphere and relatively low temperature and pressure, although very high pressures are optionally employed.

Olefins which are suitably polymerized or copolymerized in the practice of this invention are generally the aliphatic α-monoolefins having from 2 to 18 carbon atoms. Illustratively, such α-olefins can include ethylene, propylene, butene-1, pentene-1, 3-methylbutene-1, hexene-1, octene-1, dodecene-1, octadecene-1 and the like. It is understood that α-olefins may be copolymerized with other α-olefins and/or with small amounts, i.e., up to about 10 weight percent based on the polymer, of other ethylenically unsaturated monomers such as butadiene, isoprene, cyclopentadiene, pentadiene-1,3- styrene, α-methylstyrene and similar ethylenically unsaturated monomers which do not desstroy conventional Ziegler catalysts. Most benefits are realized in the polymerization of aliphatic α-monoolefins, particularly ethylene and mixtures of ethylene and up to 10, especially from 0.1 to 5, weight percent based on the weight of the resulting polymer of propylene, butene-1 or similar higher α-olefin.

Most advantageously, the novel catalyst composition of the present invention is the reaction product of (A) a compound of trivalent or tetravalent titanium and (B) an intermediate reaction product of a hydrocarbon soluble complex of an organomagnesium compound with a metallic halide corresponding to the empirical formula $MR_{3-a}X_a$ wherein M is a metal of Group 3a of Mendeleev's Periodic Table of Elements; R is alkyl, alkoxy, aryl and aryloxy; X is halogen preferably chloride, bromide, and iodide, a is in the range of about 1 to 3, preferably from about 1 to 2. In embodiments less preferred than the preceding one wherein an organomagnesium compound is employed as the organomagnesium component, it is necessary that the metallic halide be an organometallic compound corresponding to the aforementioned empirical formula wherein a is from 1 to 2.1. In either case, the foregoing catalyst composition preferably has an atomic ratio of Mg:Ti in the range from about 20:1 to about 200:1, most preferably from about 40:1 to about 80:1, an atomic ratio of M:Ti in the range from preferably about 40:1 to about 400:1, more preferably from about 60:1 to about 150:1 and an atomic ratio of Mg:X in the range from about 0.05:1 to about 1:1, preferably from about 0.1:1 to about 0.5:1, most preferably from about 0.2:1 to 0.4:1.

The titanium compound is preferably a titanium ester (often called titanate) such as an alkoxide or an aryloxide, especially an alkoxide having from 1 to 12 carbon atoms or a phenoxide, of trivalent or tetravalent titanium. Such titanates are preferably derived from halides of trivalent or tetravalent titanium wherein one or more halogen atoms are replaced by an alkoxy or aryloxy group. Alkyl titanates which are also suitably employed as the titanium ester are readily prepared by reacting an alkoxy titanium compound with magnesium alkyl. Exemplary preferred titanates include tetrabutoxytitanium, tetra(isopropoxy)titanium, diethoxytitanium bromide, dibutoxytitanium dichloride, n-butyl (triisopropoxy)titanium, ethyl dibutoxytitanium chloride, monoethoxytitanium trichloride, tetraphenoxytitanium and the like. Of the preferred titanates, the tetravalent ones wherein all halogen atoms are replaced by alkoxide are most preferred, with tetra(isopropxy)titanium and tetrabutoxytitanium being especially preferred.

In addition, other compounds of trivalent and tetravalent titanium are also suitable such as the halides, oxyhalides, amides, acetylacetonates, alkyls, aryls and the like with the halides such as the chlorides and bromides being the more advantageous. Of particular interest in this group of titanium compounds are titanium tetrachloride and titanium trichloride.

Preferably the organomagnesium compound is dihydrocarbylmagnesium such as the magnesium dialkyls and the magnesium diaryls. Exemplary suitable magnesium dialkyls include dibutylmagnesium, dipropylmagnesium, diethylmagnesium, dihexylmagnesium, propylbutylmagnesium and others wherein alkyl has from 1 to 20 carbon atoms, preferably from 2 to 12 carbon atoms. Especially preferred are the hydrocarbon soluble magnesium dialkyls such as (se-butyl) (n-butyl)magnesium, dihexylmagnesium, and others, particularly those described in U.S. Pat. No. 3,646,231. Exemplary suitable magnesium diaryls include diphenylmagnesium, dibenzylmagnesium, and ditolylmagnesium, with the dialkylmagnesiums such as dibutylmagnesium, being especially preferred. Other suitable organomagnesium compounds include alkyl and aryl magnesium halides and alkyl and aryl magnesium alkoxides and aryloxides with the latter being more advantageous than the halides in that they are soluble in hydrocarbon.

In an especially preferred embodiment, the organomagnesium component is an organomagnesium complex, empirically illustrated as $MgR_2 \cdot xAlR_3$ wherein R is hydrocarbyl, preferably alkyl, and x is about 0.01 to 10 especially from about 0.15 to about 2.5. This complex is prepared by reacting particulate magnesium such as magnesium turnings or magnesium particles with about a stoichiometric amount of hydrocarbyl halide, illustrated as RX. The resulting hydrocarbon insoluble $MgR_2$ is then solubilized by adding $AlR_3$ and forming the hydrocarbon soluble organomagnesium complex. The amount of $AlR_3$ which is added to the $MgR_2$ to form the organomagnesium complex should be enough to solubilize a significant amount of $MgR_2$, e.g., at least 5 weight percent of $MgR_2$ is solubilized. It is preferred to solubilize at least 50 weight percent of the $MgR_2$ and especially preferred to solubilize all of $MgR_2$. In suitable embodiments, other organometallic compounds such as organozinc compounds and mixtures thereof which solubilize the organomagnesium compound in hydrocarbon are substituted in part or in total for $AlR_3$ usually in amount sufficient to produce an atomic ratio of 0.01:1 to 10:1 of metal to magnesium.

The metallic halides of the formula set forth hereinbefore are organometallic halies and metal halides wherein the metal is in Group 3a of Mendeleev's Periodic Table of Elements. Alkylaluminum halides of the formula $AlR_{3-a}X_a$ wherein R is alkyl, and X and a are as defined hereinbefore. Exemplary preferred alkylaluminum halides are ethylaluminum sesquichloride, diethylaluminum chloride, ethylaluminum dichloride, and diethylaluminum bromide, with ethylaluminum sesquichloride being especially preferred. Alternatively, a metal halide such as aluminum trichloride or a combination of aluminum trichloride with an alkyl aluminum halide or a trialkyl aluminum compound may be suitably employed.

In a preferred practice of the present invention, it is beneficial if the intermediate reaction product of the aluminum halide compound and the organomagnesium component, preferably the organomagnesium complex, is mixed with the titanium compound.

In the preparation of the intermediate product, the organomagnesium component is preferably combined with the metallic halide, preferably an organoaluminum halide, by adding the magnesium component to organoaluminum halide, advantageously dispersed in a hydrocarbon diluent. Alternatively, the desired reaction product may be formed by mixing the magnesium component with a metal halide such as aluminum trihalide or a combination thereof with an organoaluminum halide or hydrocarbyl aluminum compound such as a trialkyl aluminum. In an especially preferred method of making the intermediate product, the magnesium component and metallic halide are each divided into portions which are added in alternative fashion to a reaction vessel. For example one-half of the magnesium component may be added to one-half of the metallic halide followed by the sequential addition of one-fourth of the magnesium component, the remaining metallic halide and finally the remaining magnesium component. The reaction between the organomagnesium component and the organometallic halide or a metal halide causes the formation of a finely divided insoluble material. This intermediate reaction product now contains hydrocarbon insoluble portions as well as soluble portions. In the case of the organoaluminum halide or the aluminum halide, the amount of the halide added to the organomagnesium component is sufficient to provide an atomic ratio of Mg:X of from about 0.05:1 to about 1:1, preferably from about 0.1:1 to about 0.5:1, especially from about 0.2:1 to about 0.4:1. However, the amount of halide should not be in such amount as to produce significant quantities of monoalkyl aluminum dihalide or similar catalyst deactivating agents.

The aforementioned intermediate reaction product is mixed with an amount of titanium compound, preferably by adding the titanium compound to the intermediate reaction product, to provide a catalytic reaction product having an atomic ratio of Al:Ti in the range from about 40:1 to 400:1, most preferably from 60:1 to 150:1 and an atomic ratio of Mg:Ti in the range from 20:1 to 200:1, most preferably from 40:1 to 80:1.

While the catalytic reaction product prepared in the foregoing manner is especially preferred in the practice of this invention, a suitable reaction product can be prepared by reacting an organomagnesium compound as defined hereinbefore with the metallic halide, $MR_{3-a}X_a$, as defined hereinbefore and subsequently reacting the intermediate reaction product with titanium compound in the proportions specified hereinbefore. As a further alternative method, a suitable catalytic reaction product may be prepared by mixing an organomagnesium component with titanium compound and subsequently reacting this mixture with the metallic halide, $Mr_{3-a}X_a$. Also, a suitable, but less preferred, catalytic reaction product is readily formed by first mixing the titaium compound and the metalic halide, preferably alkyl aluminum halide, and subsequently combining the mixture with the magnesium component. The mixture of titanate and metallic halide is optionally washed to remove organic soluble components prior to combination with the magnesium component.

In the preparation of the foregoing catalytic reaction products, it is desirable to carry out such preparation in the presence of an inert diluent, preferably a hydrocarbon diluent. The concentrations of catalyst components are preferably such that when the metallic halide, e.g., alkyl aluminum halide, and the magnesium component are combined the resultant slurry is from about 0.1 molar (moles/liter) with respect to magnesium up to the maximum amount which will produce a stirrable slurry of the intermediate reaction product. Concentration of the magnesium component in the intermediate reaction mixture is necessary in order to obtain a high bulk density polyolefin (preferably polyethylene) powder. It is therefore desirable that the concentration of the magnesium in the intermediate reaction mixture, usualy be from about 0.1 to about 0.5 molar, preferably 0.1 to 0.4, and most preferably 0.25 to 0.3 molar with respect to magnesium. Subsequent to the formation of the intermediate reaction product, the intermediate reaction mixture can be diluted as desired without diminishing the ability of the catalyst to produce high bulk density polyolefin powders. By way of an example of suitable inert organic diluents can be mentioned liquefied ethane, propane, isobutane, n-butane, n-hexane, the various isomeric hexanes, isooctane, paraffinic mixtures of alkanes having from 8 to 9 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about $-50°$ to about $200°$ C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about $-50°$ to about $150°$ C., preferably from about $0°$ to about $50°$ C. The period of mixing is not considered to be critical as it is found that a sufficient catalyst composition most often occurs within about 1 minute or less.

In the polymerizatin process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about $0°$ to about $175°$ C., preferably at slurry polymerization temperatures, e.g., from about $0°$ to about $95°$ C., more preferably from about $50°$ to $90°$ C., for a residence time of about 30 minutes to several hours, preferably 1 hour to 4 hours. It is generally desirable to carry out the polymerization in the absence of moisture and oxygen and a catalytic amount of the catalytic reaction product is generally within the range from about 0.0001 to about 0.01 milligram-atoms titanium per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined as hereinbefore.

The polymerization pressures preferably employed are relatively low, e.g., from about 50 to about 500 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain on ethylene concentration in the solvent in the range from about 0.1 to about 10 weight percent. To achieve this concentration when an excess of ethylene is fed into the system, a portion of the ethylene can be vented.

Hydrogen is often employed in the practice of this invention to lower molecular weight of the resultant polymer. For the purpose of this invention, it is beneficial to employ hydrogen in concentrations ranging from about 20 to about 80 volume percent in the gas phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

GENERAL OPERATING PROCEDURE FOR WORKING EXAMPLES

In the following examples the catalyst preparations are carried out in the absence of oxygen or water in a nitrogen filled gloved box. The catalyst components are used as diluted solutions in n-hexane. The polymerization reactions are carried out in a one liter stirred batch reactor at 85° C. unless otherwise stated. In such polymerization reactions one-half liter of dry oxygen-free n-hexane is added to the reactor. The catalyst is then pressured into the reactor using nitrogen and the reactor temperature is maintained for the desired polymerization time. The reactor is vented to about 20 psig and heated to 85° C. and 25 to 50 psi of hydrogen is added for polymer molecular weight control. Then, 100 psi of ethylene is added to the reactor and the ethylene pressure is set to maintain the reactor pressure at 170 psig. The polymerization reactor contents are dumped into a stainless steel beaker and allowed to cool. The resulting slurry is filtered and the polymer dried and weighed.

EXAMPLE 1

Several catalysts as more specifically described in Table I are prepared by the general procedures described hereinbefore. The several catalysts are employed in several polymerization runs carried out under a nitrogen atmosphere in a one liter stirred batch reactor under slurry polymerization conditions specified in the general operating procedure. Reactor pressure during polymerization is maintained at 170 psig by the amount of ethylene being fed into the reactor. The catalysts efficiencies are reported in Table I.

TABLE I

| Run No. | CATALYST ORDER OF ADDITION(1) | Al:Mg:Ti ATOMIC RATIOS | CATALYST EFFICIENCIES, of Polyethylene/g Ti $\times 10^{-6}$ |
| --- | --- | --- | --- |
| 1 | EAS/MgR$_2$/Ti(OiPr)$_4$ | 135:75:1 | 1.01 |
| 2 | EAS/Ti(OiPr)$_4$/MgR$_2$ | 135:75:1 | 1.26 |
| 3 | MgR$_2$/EAS/Ti(OiPr)$_4$ | 108:60:1 | .802 |
| 4 | MgR$_2$*/EAS/R Ti(OiPr)$_3$** | 108:60:1 | .694 |

TABLE I-continued

| Run No. | CATALYST ORDER OF ADDITION(1) | Al:Mg:Ti ATOMIC RATIOS | CATALYST EFFICIENCIES, of Polyethylene/g Ti × $10^{-6}$ |
|---|---|---|---|
| 5 | MgR$_2$*/EAS/Ti(OiPr)$_4$ | 108:60:1 | .787 | examples of the invention
*MgR$_2$ and EAS mixed to form a slurry which is 0.25 M in magnesium. This slurry is then diluted by factor of 10-15 with hexane prior to addition of Ti(OiPr)$_4$.
**Alkyl titanate prepared by reaction of MgR$_2$ + 2Ti(OiPr)$_2$ →2RTi(OiPr)$_3$ and used same day it is prepared.
(1)Components are added to a vessel containing n-hexane in order from left to right to form a catalyst composition which is 0.005 millimolar with respect to Ti.
MgR$_2$ - di-n-butylmagnesium . 1/6 triethylaluminum
EAS - ethyl aluminum sesquichloride
Ti(OiPr)$_4$ - tetra(isopropoxy)titanium In Run Nos. 4 and 5 of Table I, the resulting polyethylene powders have bulk densities of 12-16 lbs/ft$^3$ whereas the polyethylene powders of Run Nos. 1-3 have bulk densities of 5-8 lbs/ft$^3$. The higher bulk densitis of Run Nos. 4 and 5 are the result of employing a higher concentration of organomagnesium component (0.25 molar Mg) in the intermediate reaction product. Accordingly to achieve higher bulk densities, the magnesium component is concentrated as much as possible while still retaining a stirrable catalyst slurry. Usually, a concentration in the range of 0.1 to 0.5 molar with respect to magnesium is employed with a concentration in the range from about 0.2 to about 0.4 being preferred.

EXAMPLE 2

Following the polymerization conditions set forth in Example 1 on a continuous process, several polymerization runs are carried out using catalysts similar to Run No. 1 of Example 1 except that the Cl/Mg ratio is varied from aout 2.7:1 to about 4.0:1. The results of the aforementioned runs indicate that molecular weight distribution is broadened from Mw/Mn of 4 to Mw/Mn of 8 as Cl/Mg ratio increases from 2.7:1 to 4:1.

In all of the foregoing examples, reactor fouling caused by polymer accumulation on the reactor walls is considerably reduced as compared to polymerization runs carried out under similar conditions in the presence of conventional two-compnent Ziegler catalysts.

What is claimed is:

1. A process for polymerization of an α-olefin under conditions characteristic of Ziegler polymerization at a temperature in the range from about 0° to about 95° C. and in the presence of a catalyst consisting essentialy of (I) catalytic reaction product of (A) an ester of tetravalent or trivalent titanium with (B) an intermediate reaction product of (a) an organomagnesium component selected from an organomagnesium compound or a hydrocarbon soluble complex of the organomagnesium compound and an organometallic compound which solubilizes the organomagnesium compound in hydrocarbon and (b) a metallic halide provided that during the formation of the intermediate product the concentration of the organomagnesium component is at least 0.1 molar with respect to the magnesium up to the maximum concentrations at which the intermediate reaction product in slurry form is still stirrable, said metallic halide corresponding to the empirical formula MR$_{3-a}$X$_a$ wherein N is a metal of Group 3a, R is alkyl, alkoxy, aryl or aryloxy; X is halogen; and a is in the range from 1 to 3 provided that wherein the organomagnesium component is an organomagnesium compound, a is in the range from 1 to 2.1, the proportions of the foregoing components of said catalytic reaction product being such that the atomic ratio of Mg:Ti is within the range from about 20:1 up to about 200:1, the atomic ratio of M:Ti is within the range from about 60:1 to about 150:1, the atomic ratio of Mg:X is within the range from about 0.1:1 to about 0.1:1, said catalytic reaction product being the sole catalyst of the polymerization process.

2. The process of claim 1 wherein the titanium compound is an alkoxide of titanium, the atomic ratio of Mg:Ti is within the range from about 40:1 to about 200:1, and the α-olefin is ethylene or a mixture of ethylene and from 0.1 to about 5 weight percent of propylene or butane-1 based on the resulting polymer.

3. The process of claim 1 wherein the organomagnesium component is a dihydrocarbyl magnesium or a complex of dihydrocarbyl magnesium and a trialkyl aluminum wherein the atomic ratio of Al to Mg is within the range from about 0.1:1 to about 10:1.

4. The process of claim 1 wherein the metal halide is an alkyl aluminum halide.

5. The process of claim 1 wherein the catalytic reaction roduct has a Mg:Ti ratio in the range from about 40:1 to about 80:1, and a Mg:X ratio from about 0.2:1 to about 0.4:1.

6. The process of claim 5 wherein the organomagnesium component is a hydrogen soluble complex of di(alkyl) magnesium and trialkyl aluminum, the titanium compound is a tetra(alkoxy)titanium and the metallic halide is an alkyl aluminum halide of the formula AlR$_{3-a}$X$_a$ wherein a is from about 1 to 2.1.

7. The process of claim 6 wherein the dialkyl magnesium is di(n-butyl)magnesium, the trialkyl aluminum is triethyl aluminum, the alkyl aluminum halide is ethyl aluminum sesquichloride, and the tetra(alkoxy)titanium is tetra(isopropoxy)titanium.

8. The process of claim 1 wherein the organomagnesium compound is a dihydrocarbyl magnesium, or an alkyl magnesium alkoxide, the organometallic compound is a hydrocarbyl or aluminum or zinc, and the ester is an alkoxide of trivalent or tetravalent titanium.

9. The process of claim 1 wherein the temperature is in the range from about 50° to about 90° C.

* * * * *

UNITED STATES PATENT AND TRADEMARK OFFICE
CERTIFICATE OF CORRECTION

PATENT NO. : 4,163,831

DATED : August 7, 1979

INVENTOR(S) : Donald E. Gessell

It is certified that error appears in the above-identified patent and that said Letters Patent are hereby corrected as shown below:

On the title page, Number [63], second line, delete "abandoned,".

Column 1, line 59, delete "deactivation" and insert --deactivating--.

Column 2, line 34, delete "$MR_{3-1}X_a$" and insert --$MR_{3-a}X_a$--.

Column 3, line 37, delete "desstroy" and insert --destroy--.

Column 4, line 18, delete "tetra(isopropxy)titanium" and insert --tetra(isopropoxy)titanium--.

Column 4, line 35, delete "(se-butyl)" and insert --(sec-butyl)--.

Column 5, line 2, delete "halies" and insert --halides--.

Column 6, line 5, delete "$Mr_{3-a}X_a$" and insert --$MR_{3-a}X_a$--.

UNITED STATES PATENT AND TRADEMARK OFFICE
CERTIFICATE OF CORRECTION

PATENT NO. : 4,163,831

DATED : August 7, 1979

INVENTOR(S) : Donald E. Gessell

It is certified that error appears in the above-identified patent and that said Letters Patent are hereby corrected as shown below:

Column 6, line 7, delete "titaium" and insert --titanium--.

Column 6, line 7, delete "metalic" and insert --metallic--.

Column 6, line 27, delete "usualy" and insert --usually--.

Column 6, line 56, delete "polymerizatin" and insert --polymerization--.

Column 9, Table I-continued, line 5, the first footnote, delete "examples of the invention" and insert --Run Nos. 1-3 are not examples of the invention--.

Column 9, line 32, delete "aout" and insert --about--.

Column 9, line 40, delete "two-compnent" and insert --two-component--.

Column 10, line 22, delete the second appearing "0.1:1" and insert --0.5:1--.

UNITED STATES PATENT AND TRADEMARK OFFICE
CERTIFICATE OF CORRECTION

PATENT NO. : 4,163,831

DATED : August 7, 1979

INVENTOR(S) : Donald E. Gessell

It is certified that error appears in the above—identified patent and that said Letters Patent are hereby corrected as shown below:

Column 10, line 39, delete "roduct" and insert --product--.

Column 10, line 43, delete "hydrogen" and insert --hydrocarbon--.

Signed and Sealed this

Thirteenth Day of November 1979

[SEAL]

Attest:

RUTH C. MASON
Attesting Officer

LUTRELLE F. PARKER
Acting Commissioner of Patents and Trademarks